(12) United States Patent
Grentz et al.

(10) Patent No.: US 11,814,053 B2
(45) Date of Patent: Nov. 14, 2023

(54) VEHICLE OCCUPANT EMERGENCY MONITORING

(71) Applicant: Micron Technology, Inc., Boise, ID (US)

(72) Inventors: Bethany M. Grentz, Meridian, ID (US); Diana C. Majerus, Boise, ID (US); Raksha Gopal Kulkarni, Bellevue, WA (US); Bhumika Chhabra, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 58 days.

(21) Appl. No.: 17/506,152

(22) Filed: Oct. 20, 2021

(65) Prior Publication Data

US 2023/0121931 A1    Apr. 20, 2023

(51) Int. Cl.
| | | |
|---|---|---|
| *B60W 40/08* | (2012.01) | |
| *B60W 60/00* | (2020.01) | |
| *H04W 76/50* | (2018.01) | |
| *H04W 4/90* | (2018.01) | |
| *H04W 4/44* | (2018.01) | |

(52) U.S. Cl.
CPC ........ *B60W 40/08* (2013.01); *B60W 60/0016* (2020.02); *H04W 4/44* (2018.02); *H04W 4/90* (2018.02); *H04W 76/50* (2018.02); *B60W 2040/0818* (2013.01); *B60W 2540/221* (2020.02); *B60W 2540/26* (2013.01); *B60W 2556/45* (2020.02)

(58) Field of Classification Search
None
See application file for complete search history.

(56) References Cited

U.S. PATENT DOCUMENTS

| | | |
|---|---|---|
| 8,965,621 B1 | 2/2015 | Urmson |
| 9,443,152 B2 | 9/2016 | Atsmon |
| 2017/0030705 A1 | 2/2017 | Bridges |
| 2018/0043901 A1* | 2/2018 | Kim ................. A61B 5/747 |
| 2019/0188493 A1* | 6/2019 | Tiziani ........... B60W 30/18009 |
| 2021/0041838 A1* | 2/2021 | Fujii ..................... G06N 20/00 |
| 2021/0086778 A1* | 3/2021 | Suthar .................. B60W 40/08 |
| 2022/0253550 A1* | 8/2022 | Sohmshetty ........... B60Q 5/005 |

\* cited by examiner

*Primary Examiner* — Thomas S McCormack
(74) *Attorney, Agent, or Firm* — Brooks, Cameron & Huebsch, PLLC

(57) ABSTRACT

Apparatuses, machine-readable media, and methods related to vehicle occupant emergency monitoring are described. Information regarding a medical condition of person can be used when the person is driving a vehicle according to embodiments of the present invention. Computing devices (e.g., mobile devices and/or modules having a computing device) can be configured to run an application (e.g., a vehicle occupant emergency monitoring tool) to determine whether a occupant of the vehicle is unable to continue driving the vehicle. The vehicle occupant emergency monitoring tool can receive information regarding a medical condition of the occupant, determine that the occupant is experiencing a medical emergency and that occupant can no longer safely drive the vehicle, and initiate a response to the medical emergency by providing instructions to drive the vehicle to a medical facility and/or disable the vehicle while signaling emergency services (e.g., police and/or ambulance services) for help.

20 Claims, 4 Drawing Sheets

VEHICLE OCCUPANT EMERGENCY MONITORING

TECHNICAL FIELD

The present disclosure relates generally to apparatuses, non-transitory machine-readable media, and methods for vehicle occupant emergency monitoring.

BACKGROUND

A computing device is a mechanical or electrical device that transmits or modifies energy to perform or assist in the performance of human tasks. Examples include thin clients, personal computers, printing devices, laptops, mobile devices (e.g., e-readers, tablets, smartphones, etc.), internet-of-things (IoT) enabled devices, and gaming consoles, among others. An IoT enabled device can refer to a device embedded with electronics, software, sensors, actuators, and/or network connectivity which enable such devices to connect to a network and/or exchange data. Examples of IoT enabled devices include mobile phones, smartphones, tablets, phablets, computing devices, implantable devices, vehicles, home appliances, smart home devices, monitoring devices, wearable devices, devices enabling intelligent shopping systems, among other cyber-physical systems.

A computing device can be used to transmit information to users via a display to view images and/or text, speakers to emit sound, and/or a sensors to collect data. A computing device can receive inputs from sensors on or coupled to the computing device. The computing device can be coupled to a number of other computing devices and can be configured to communicate (e.g., send and/or received data) with the other computing devices and/or to a user of the computing device.

DETAILED DESCRIPTION

Figure 1:
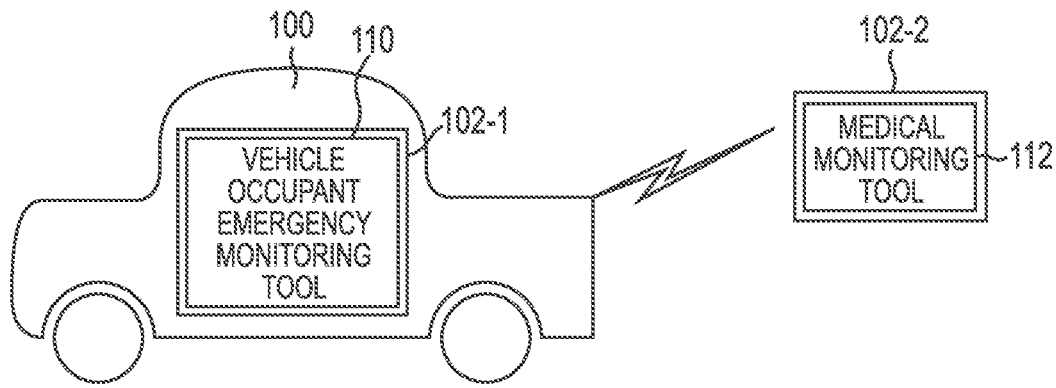
FIG. 1 is a functional diagram representing an example system for vehicle occupant emergency monitoring in accordance with a number of embodiments of the present disclosure.

Apparatuses, machine-readable media, and methods related to vehicle occupant emergency monitoring are described. Receiving information regarding a medical condition of a person can provide valuable information regarding the health of the person to the person, family of the person, or medical care providers for the person. The information regarding a medical condition of person can also be used when the person is driving a vehicle according to embodiments of the present invention. Computing devices (e.g., mobile devices and/or modules having a computing device) can be configured to run an application (e.g., a vehicle occupant emergency monitoring tool) to determine whether a occupant of the vehicle is unable to continue driving the vehicle. The vehicle occupant emergency monitoring tool can receive information regarding a medical condition of the occupant (e.g., driver and/or passenger), determine that occupant can no longer safely drive the vehicle due to a medical emergency or other reasons (e.g., the ability to no longer drive the vehicle can be due the driver being at least partially incapacitated and/or a driver undergoing a medical emergency such that the driver is distracted and no longer safely drive the vehicle without being distracted), and initiate a response to the medical emergency by providing instructions to drive the vehicle to a medical facility and/or disable the vehicle while signaling emergency services (e.g., police and/or ambulance services) for help. The vehicle occupant emergency monitoring tool can be used to monitor the occupant of a vehicle and initiate a response to a medical emergency of the occupant so that medical attention can be provided to the occupant without intervention by the occupant if the occupant is incapacitated or unaware of the medical emergency. Therefore, the vehicle occupant emergency monitoring tool allows for immediate response to a medical emergency where time can be critical to providing medical attention to a medical emergency.

The vehicle occupant emergency monitoring tool can receive data indicative of a medical condition of a occupant of vehicle from a medical monitoring device, determine that occupant of the vehicle is experiencing a medical emergency in response to receiving the data indicative of the medical condition of the occupant of the vehicle, and initiate a response to the medical emergency. The vehicle occupant emergency monitoring tool can also receive an indication from the medical monitoring tool that the occupant of the vehicle is experiencing a medical emergency. In response to determining that a response to the medical emergency is needed, the vehicle occupant emergency monitoring tool can send instructions to drive the vehicle to a medical facility. The vehicle occupant emergency monitoring tool can also send a notification to the medical facility indicating the medical condition of the occupant and that the vehicle will be arriving at the medical facility along with an estimated time of arrival at medical facility. The vehicle occupant emergency monitoring tool can also send a notification to emergency services (e.g., police and/or ambulance services) of a route the vehicle is taking to the medical facility and/or a notification to other vehicles on the road of a medical emergency.

The vehicle occupant emergency monitoring tool can initiate a response to the medical emergency by providing instructions to pull the vehicle to the side of the road and signal to emergency services for help. The signal to emergency services can provide the location of the vehicle and along with the medical condition of the occupant.

The vehicle occupant emergency monitoring tool can include user settings that indicate their preferred medical facility provider, whether or not the occupant or a family member need to confirm authorization to initiate the response to the medical emergency, whether or not the occupant would like family members or preferred medical providers notified of the medical emergency, among other settings.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, designators such as "N," "M," etc., particularly with respect to reference numerals in the drawings, indicate that a number of the particular feature so designation can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures can be identified by the use of similar digits. For example, 120 can reference element "20" in FIG. 1, and a similar element can be referenced as 220 in FIG. 2. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional diagram representing an example system for vehicle occupant emergency monitoring in accordance with a number of embodiments of the present disclosure. The system can include vehicle occupant emergency monitoring tool 110 and medical monitoring device 112. The vehicle occupant emergency monitoring tool 110 and medical monitoring device 112 can be located on and/or operated by computing devices 102-1 and 102-2, respectively. Computing device 102-1 can be on a module that is external to, couplable to, and removable from a control panel and/or on board diagnostic (OBD) unit of vehicle 100. Computing device 102-2 can be a mobile device of a occupant of the vehicle 100. The user of the medical monitoring device 112 can be the occupant of the vehicle 100. Vehicle 100 can be an autonomous vehicle that can operate and drive the vehicle without input from the occupant.

The vehicle occupant emergency monitoring tool 110 can be an application that is run using processing resources and/or memory resources of a computing device. Vehicle occupant emergency monitoring tool 110 can receive inputs from medical monitoring device 112. The vehicle occupant emergency monitoring tool 110 can be wirelessly and/or physically coupled to the medical monitoring device 112.

Vehicle occupant emergency monitoring tool 110 and medical monitoring device 112 can be wirelessly coupled such that the medical monitoring device 112 can send data indicative of the medical condition of the occupant of the vehicle to the vehicle occupant emergency monitoring tool 110. Vehicle occupant emergency monitoring tool 110 can use the data indicative of the medical condition of the occupant to determine whether the occupant of the vehicle is experiencing a medical emergency and is no longer able to safely operate the vehicle. If vehicle occupant emergency monitoring tool 110 determines that the occupant of the vehicle is experiencing a medical emergency, the vehicle occupant emergency monitoring tool 110 can provide instructions to drive the vehicle to a medical facility in an autonomous vehicle driving mode. The vehicle can drive to the medical facility without interaction with the occupant of the vehicle that is experiencing the medical emergency. Also, vehicle occupant emergency monitoring tool 110 can include a setting for a preferred medical facility so that instructions are provided to drive the vehicle to the preferred medical facility during a medical emergency.

Vehicle occupant emergency monitoring tool 110 can share the medical emergency information, including the medical condition of the occupant, and/or the route that the vehicle will be driving with the medical facility, family members of the occupant, preferred medical providers of the occupant, and/or emergency service providers, such as police and/or ambulance services.

Vehicle occupant emergency monitoring tool 110 and medical monitoring device 112 can be wirelessly coupled such that the medical monitoring device 112 can send data indicative of a medical emergency of the occupant of the vehicle to the vehicle occupant emergency monitoring tool 110. Vehicle occupant emergency monitoring tool 110 can use the data indicative of the medical emergency to initiate a response to the medical emergency by provide instructions to drive the vehicle to a medical facility in an autonomous vehicle driving mode.

Figures 2A, 2B:
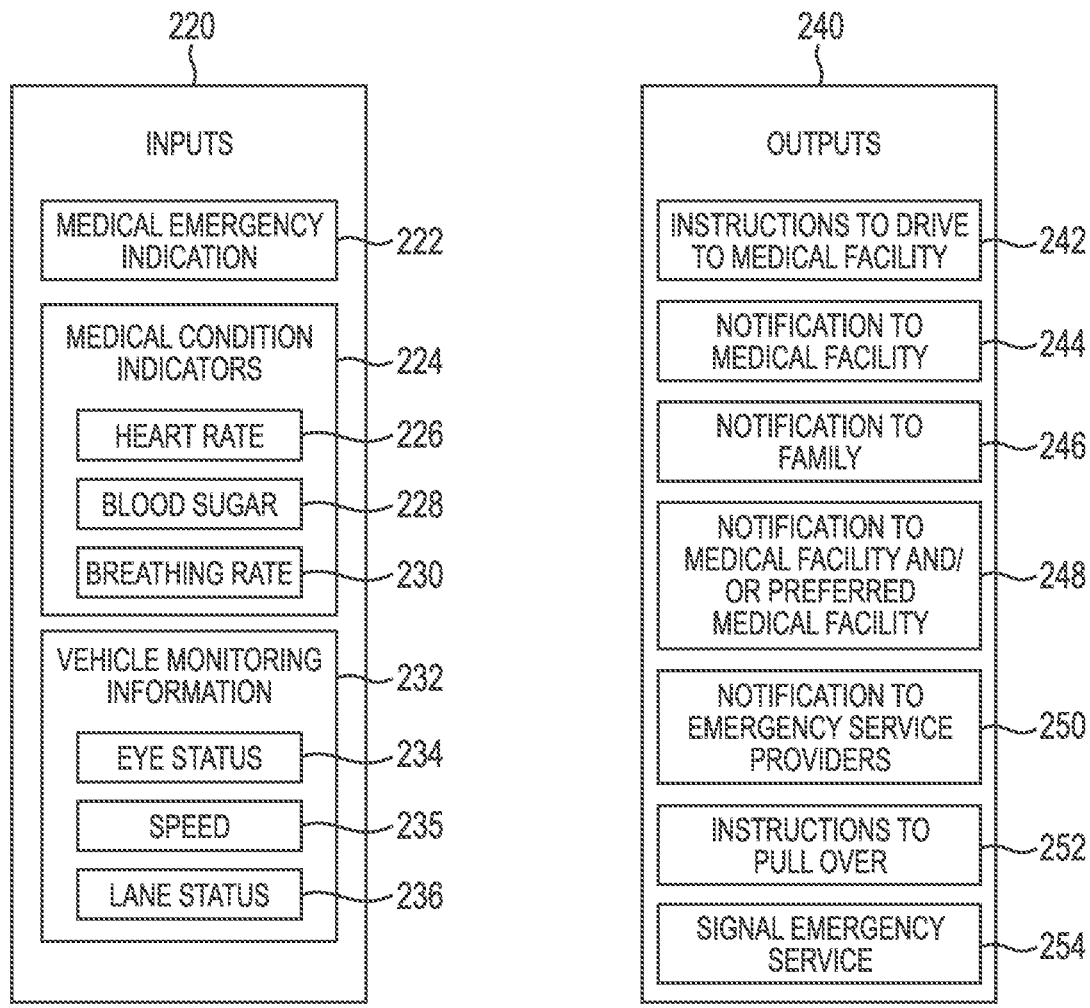
FIG. 2A is a diagram representing example of inputs for vehicle occupant emergency monitoring in accordance with a number of embodiments of the present disclosure.
FIG. 2B is a diagram representing example of outputs for vehicle occupant emergency monitoring in accordance with a number of embodiments of the present disclosure.

FIG. 2A is a diagram representing example of inputs for a vehicle occupant emergency monitoring tool in accordance with a number of embodiments of the present disclosure. Vehicle occupant emergency monitoring tool (e.g., vehicle occupant emergency monitoring tool 110 in FIG. 1) can receive a number of inputs 220. Inputs 220 can include a medical emergency indication 222, medical condition indicators 224, and or vehicle monitoring information 232. The medical emergency indication 222 can be received from a medical monitoring device of the user and can indicate that a response to the medical emergency is needed. The vehicle occupant emergency monitoring tool can provide instructions to drive the vehicle to a medical facility in response to receiving medical emergency indication 222.

Inputs 220 can include medical condition indicators 224. The medical condition indicators 224 can include the heart rate 226, blood sugar level 228, and/or breathing rate 230 of the occupant of the vehicle, for example, among other medical condition indicators. The vehicle occupant emergency monitoring tool can use the medical condition indicators to determine if the occupant is experiencing a medical emergency and is no longer able to drive the vehicle safely.

For example, if the heart rate 226, blood sugar levels 228, and/or breathing rate 230 of the occupant drop below threshold values, the vehicle occupant emergency monitoring tool can initiate a response to a medical emergency based on the received medical condition indicators 224.

Medical condition indicators 224 can also include an input indicating the occupant of the vehicle is incapacitated. The vehicle occupant emergency monitoring tool can receive such a medical condition indicator 224 that indicates the occupant is incapacitated and implement a response to the medical condition indicator 224.

Inputs 220 can include vehicle monitoring information 232. Vehicle monitoring information 232 can include an input indicating a status of the eyes of the occupant 234 (e.g., whether or not the occupant's eyes are open), an input indicating the speed of the vehicle 235, and/or an input indicating a lane departure status 236. Vehicle monitoring information 232 can be received by the vehicle occupant emergency monitoring tool and used to determine if the vehicle is being safely operated by the occupant. If the occupant's eyes are closed or not tracking the road; the speed of the vehicle is erratic, too slow, and/or too fast; and/or the vehicle is not maintaining their lane on the road sent to a vehicle service provider, the vehicle monitoring information 232 can be used by the vehicle occupant emergency monitoring tool, along with the medical condition indicators 224 or independent of the medical condition indicators 224, to determine the occupant of the vehicle is experiencing a medical emergency and initiate a response to the medical emergency.

FIG. 2B is a diagram representing example of outputs for a vehicle occupant emergency monitoring tool in accordance with a number of embodiments of the present disclosure. Vehicle occupant emergency monitoring tool (e.g., vehicle occupant emergency monitoring tool 110 in FIG. 1) can send a number of outputs 240. Outputs 240 can include instructions to drive to a medical facility 242, a notification of the medical emergency to a medical facility 244, a notification of the medical emergency to family of the person experiencing the medical emergency 246, a notification of the medical emergency to medical facility where the vehicle is driving and/or a preferred medical provider of the person experiencing the medical emergency 248, a notification of the medical emergency to emergency service providers 250 (e.g., police and/or ambulance services), instructions to pull over the vehicle over 252, and/or signal to emergency service providers (e.g., police and/or ambulance services) that help is needed for the medical emergency 254.

Figure 3:
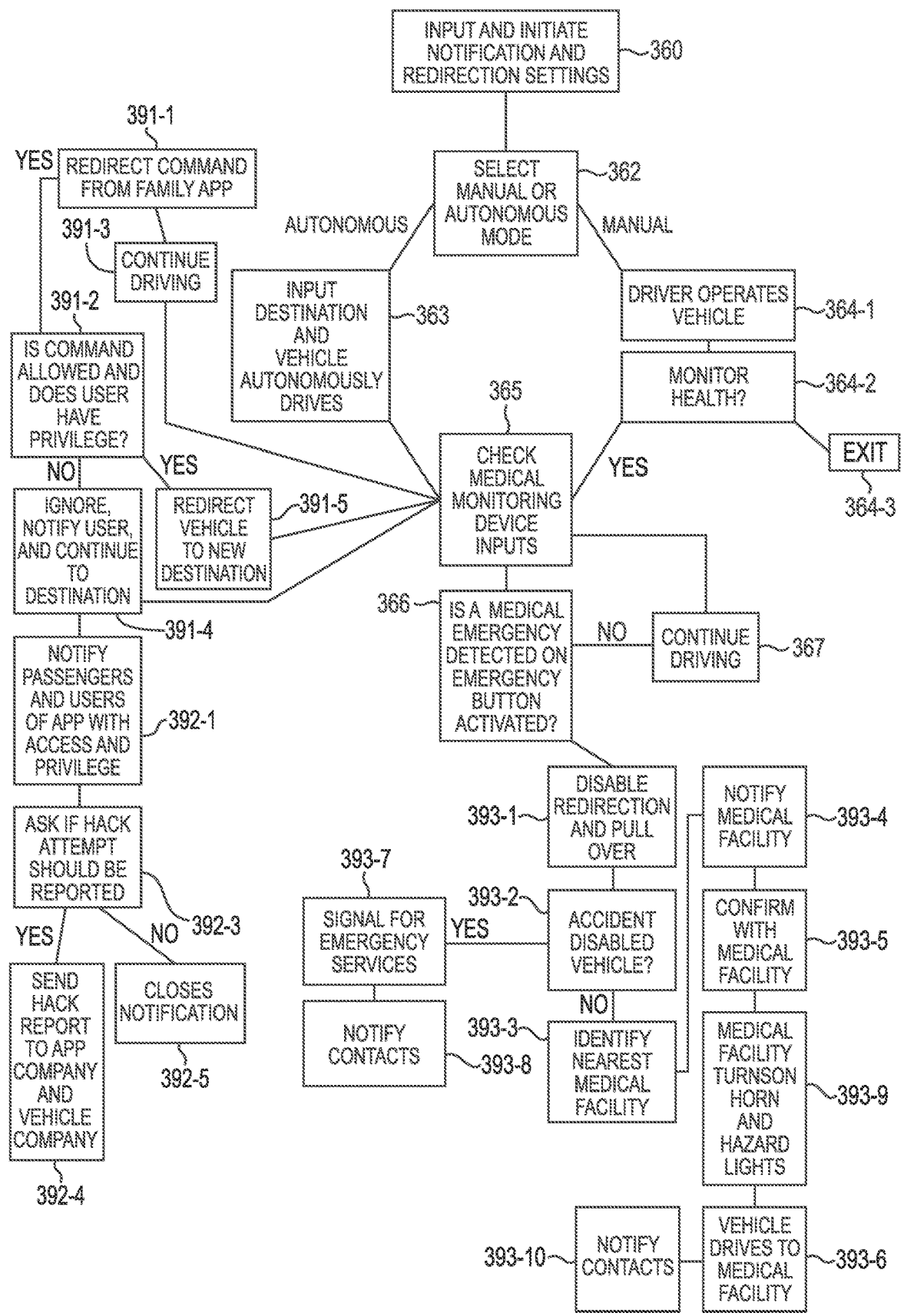
FIG. 3 is a flow diagram representing an example method for vehicle occupant emergency monitoring in accordance with a number of embodiments of the present disclosure.

FIG. 3 is a flow diagram representing an example method for vehicle occupant emergency monitoring in accordance with a number of embodiments of the present disclosure. The method includes inputting and initiating notification settings and redirection privileges 360 in a vehicle occupant emergency monitoring tool. The settings can include indicating a list of contacts, such as family members, friends, and/or medical providers, among other contacts, to contact in the event of a medical emergency, and a number of criteria, such as severity of medical emergency, for example, for initiating contacting the list of contacts. The settings can also include a preferred medical facility in the event of a medical emergency.

The method includes the occupant selecting driving autonomous mode or manual mode 362. If the occupant selects manual mode, the occupant operates the vehicle 364-1 and the occupant can select if they would like the vehicle occupant emergency monitoring tool to monitor the health of the driver or another occupant of the vehicle 364-2.

If monitoring of the health of an occupant is desired, the method goes to step 365. If monitoring of the health of an occupant is desired, the method goes to step 364-3 and the method exits the flow and is ended. If the occupant selects autonomous mode, the drive inputs the destination into the control panel of the vehicle and the vehicle autonomously drives the vehicle to the destination 363.

Once driving the vehicle autonomously, the method can include receiving a redirect command from a user of a family app 391-1. The family app can be an application that can allow a list of users (e.g., family, friends, and/or authorized users to interact the with the autonomous vehicle). The list of user can include authorization for people on the list of user to send a redirection command to the autonomous vehicle. The authorization of the redirection commands can be based on upon a time or a location. For example, a parent of the driver may be authorized to redirect the autonomous vehicle to a school during the weekdays from 7 am to 4 pm. If the redirection commands is not from the family app, the method can include continue driving 391-3 to the destination input in step 363. If the redirection commands is from the family app, the method can include checking to see if the user that sent the redirection command is allowed (e.g., authorized) to redirect the vehicle 391-2. If the redirection command is allowed, the vehicle can be redirected to the new destination 391-5. If the redirection command is not allowed, the redirection command can be ignored, the users of the app can be notified of the not allowed redirection command, and the vehicle can continue to the destination 391-5. If the redirection command is not allowed, safety features of the app can be implemented by checking if the users have privileges to redirect the vehicle 392-1. The users of the app can be notified of the redirection command and the users can be asked to confirm if any of them sent the redirection command 392-2. If the redirection command was not sent by the users of the app, the method can include categorizing the redirection command as a hack attempt and asking if the hack attempt should be reported 392-3. If the hack attempt should be reported, the hack report is sent to the app developer and/or police 39204. If the hack attempt should not be reported, the notification process closes 392-5.

Once the vehicle is driving, in manual or autonomous mode, the method can include checking the medical monitoring device inputs 365 that are sent to the vehicle occupant emergency monitoring tool. The method can include determining if there is a medical emergency or an emergency button activated 366. A medical emergency can be determined to be taking place, by analyzing medical condition inputs and/or vehicle monitoring inputs. A medical emergency can also be determined by an input from the medical monitoring device that indicates a medical emergency is taking place as determined by the medical monitoring device or a user activating an emergency button. If a medical emergency is not detected, the vehicle can continue to drive 367 and the method can return to step 365 where the medical monitoring device inputs are checked.

If a medical emergency is detected, the method can initiate a response to the medical emergency by disabling the ability to redirect the vehicle by users of the app and pull the vehicle over 393-1. The method can include detecting if the vehicle has been in an accident and/or if the vehicle is able to be operated (e.g., the accident has caused the vehicle to be inoperable) 393-2. The method can include identifying the nearest medical facility 393-3. The method can include sending a notification to the medical facility indicating the medical condition of the occupant including the present state and allergies of the occupant 393-4. The method can include confirming that the medical facility can treat the medical condition of the occupant 393-5. The method can including turning on the horn and hazard lights of the vehicle with instructions generated by based on an input from the application and/or instructions from the medical facility 393-5. The method can include routing the vehicle to the medical facility and sending updates to the medical facility regarding the condition of the occupant, location of the vehicle, and estimated time of arrival 393-6. The method can include sending a notification to the family members of the medical emergency, the medical condition of the occupant, and the location of the medical facility where the vehicle is being driven 393-10.

If a medical emergency is detected, the method can initiate a response to the medical emergency by sending instructions to drive the vehicle to a medical facility. The method can include sending a notification to the family members of the medical emergency, the medical condition of the occupant, and the location of the medical facility where the vehicle is being driven. The method can include sending a notification to the medical facility indicating the medical condition of the occupant and that the vehicle will be arriving at the medical facility along with an estimated time of arrival at medical facility. The method can include sending a notification to emergency services (e.g., police and/or ambulance services) of a route the vehicle is taking to the medical facility and/or a notification to other vehicles on the road of a medical emergency. The method can include sending a notification to other vehicle on the route to the medical facility of the medical emergency. The notification can be sent to other vehicles so the vehicles can be warned and to pull over when the vehicle with the occupant experiencing the medical emergency is approaching.

If a medical emergency is detected, the method can initiate a response to the medical emergency by providing instructions to pull the vehicle to the side of the road 393-1. The method can include determining if the vehicle is disabled 393-2 and signal to emergency services for help 393-7 in response to the vehicle being disabled. The signal to emergency services can provide the location of the vehicle and along with the medical condition of the occupant. The method can include sending a notification to the contact list of the medical emergency, the medical condition of the occupant, and the vehicle and/or location of the medical facility where the occupant with the medical emergency is being driven 393-8.

Figure 4A:
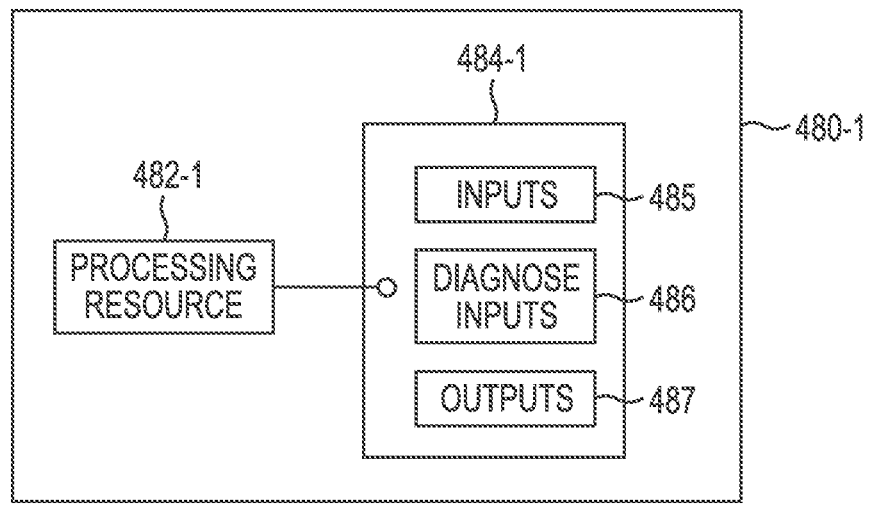
FIG. 4A is a functional diagram representing a processing resource in communication with a memory resource having instructions written thereon of a computing device coupled to a vehicle in accordance with a number of embodiments of the present disclosure.

FIG. 4A is a functional diagram representing a processing resource 482-1 in communication with a memory resource 484-1 having instructions 485, 486, and 487 written thereon of a computing device coupled to a vehicle in accordance with a number of embodiments of the present disclosure. In some examples, the processing resource 480-1 and memory resource 484-1 comprise a system 480-1 such as a vehicle occupant emergency monitoring tool (e.g., vehicle occupant emergency monitoring tool 110 illustrated in FIG. 1).

The system 480-1 can include a computing with processing resource 482-1. The system 480-1 can be coupled (e.g., coupled via a wireless network) to other systems and/or computing devices (e.g., system 480-2 in FIG. 4B). The system 480-1 can further include the memory resource 484-1 (e.g., a non-transitory MRM), on which may be stored instructions, such as instructions 485, 486, and 487. Although the following descriptions refer to a processing resource and a memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

The memory resource 484-1 may be electronic, magnetic, optical, or other physical storage device that stores executable instructions. Thus, the memory resource 484-1 may be, for example, non-volatile or volatile memory. For example, non-volatile memory can provide persistent data by retaining written data when not powered, and non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory, resistive random access memory (RRAM), ferroelectric random access memory (FeRAM), magnetoresistive random access memory (MRAM), and programmable conductive memory, among other types of memory. Volatile memory can require power to maintain its data and can include random-access memory (RAM), dynamic random-access memory (DRAM), and static random-access memory (SRAM), among others.

In some examples, the memory resource 484-1 is a non-transitory MRM comprising Random Access Memory (RAM), an Electrically-Erasable Programmable ROM (EEPROM), a storage drive, an optical disc, and the like. The memory resource 484 may be disposed within a controller and/or computing device. In this example, the executable instructions 485, 486, and 487 can be "installed" on the device. Additionally, and/or alternatively, the memory resource 484-1 can be a portable, external or remote storage medium, for example, that allows the system to download the instructions 485, 486, 487 from the portable/external/remote storage medium. In this situation, the executable instructions may be part of an "installation package". As described herein, the memory resource 484-1 can be encoded with executable instructions for vehicle occupant emergency monitoring.

The instructions 485, when executed by a processing resource such as the processing resource 482-1, can include instructions to receive at the processing resource 482-1, the memory resource 484-1, or both, inputs from a medical monitoring device. In some examples, the inputs from the medical monitoring device can include a medical emergency indication, medical condition indicators and/or vehicle monitoring indicators.

The instructions 486, when executed by a processing resource such as processing resource 482-1, can include instructions to use the inputs from the medical monitoring device to determine that an occupant of the vehicle is experiencing a medical emergency.

The instructions 487, when executed by a processing resource such as the processing resource 482-1, can include instructions to send at the processing resource 482-1, the memory resource 484-1, or both, outputs from vehicle occupant emergency monitoring tool. In some examples, the outputs can instructions to drive to a medical facility, a notification of the medical emergency to a medical facility, a notification of the medical emergency to family of the person experiencing the medical emergency, a notification of the medical emergency to medical facility where the vehicle is driving and/or a preferred medical provider of the person experiencing the medical emergency, a notification of the medical emergency to emergency service providers (e.g., police and/or ambulance services), instructions to pull over the vehicle over, and/or signal to emergency service providers (e.g., police and/or ambulance services) that help is needed for the medical emergency.

Figure 4B:
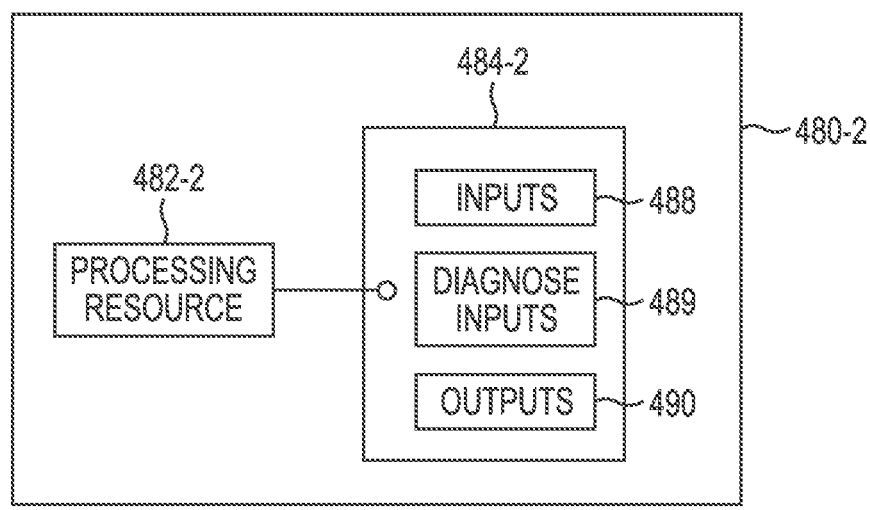
FIG. 4B is a functional diagram representing a processing resource in communication with a memory resource having instructions written thereon of a computing device for medical monitoring in accordance with a number of embodiments of the present disclosure.

FIG. 4B is a functional diagram representing a processing resource 482-2 in communication with a memory resource 484-2 having instructions 488, 489, and 490 written thereon of a computing device for medical monitoring in accordance with a number of embodiments of the present disclosure. In some examples, the processing resource 482-2 and memory resource 484-2 comprise a system 480-2 such as a medical monitoring device (e.g., medical monitoring device 112 illustrated in FIG. 1).

The system 480-2 can include a computing with processing resource 482-2. The system 480-2 can be coupled (e.g., coupled via a wireless network) to other systems and/or computing devices (e.g., system 480-1 in FIG. 4A). The system 480-2 can further include the memory resource 484-2 (e.g., a non-transitory MRM), on which may be stored instructions, such as instructions 488, 489, and 490. Although the following descriptions refer to a processing resource and a memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

The memory resource 484-2 may be electronic, magnetic, optical, or other physical storage device that stores executable instructions. Thus, the memory resource 484-2 may be, for example, non-volatile or volatile memory. For example, non-volatile memory can provide persistent data by retaining written data when not powered, and non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory, resistive random access memory (RRAM), ferroelectric random access memory (FeRAM), magnetoresistive random access memory (MRAM), and programmable conductive memory, among other types of memory. Volatile memory can require power to maintain its data and can include random-access memory (RAM), dynamic random-access memory (DRAM), and static random-access memory (SRAM), among others.

In some examples, the memory resource 484-2 is a non-transitory MRM comprising Random Access Memory (RAM), an Electrically-Erasable Programmable ROM (EEPROM), a storage drive, an optical disc, and the like. The memory resource 464 may be disposed within a controller and/or computing device. In this example, the executable instructions 488, 489, and 490 can be "installed" on the device. Additionally, and/or alternatively, the memory resource 484-2 can be a portable, external or remote storage medium, for example, that allows the system to download the instructions 488, 489, and 490 from the portable/external/remote storage medium. In this situation, the executable instructions may be part of an "installation package". As described herein, the memory resource 484-2 can be encoded with executable instructions for monitoring medical conditions of a user.

The instructions 488, when executed by a processing resource such as the processing resource 482-2, can include instructions to receive at the processing resource 482-2, the memory resource 484-2, or both, inputs indicative of medical conditions of a user. In some examples, the inputs can include the heart rate 226, blood sugar level 228, and/or breathing rate 230 of the occupant of the vehicle, for example, among other medical condition indicators.

The instructions 489, when executed by a processing resource such as processing resource 482-2, can include instructions to use the inputs to determine that an occupant of a vehicle is experiencing a medical emergency.

The instructions 490, when executed by a processing resource such as processing resource 482-2, can include instructions to send outputs indicative of medical conditions of a user and/or an indication of a medical emergency. In some examples, the outputs can include the heart rate, blood sugar level, and/or breathing rate of the occupant of the vehicle, for example, among other medical condition indicators.

Figure 5:
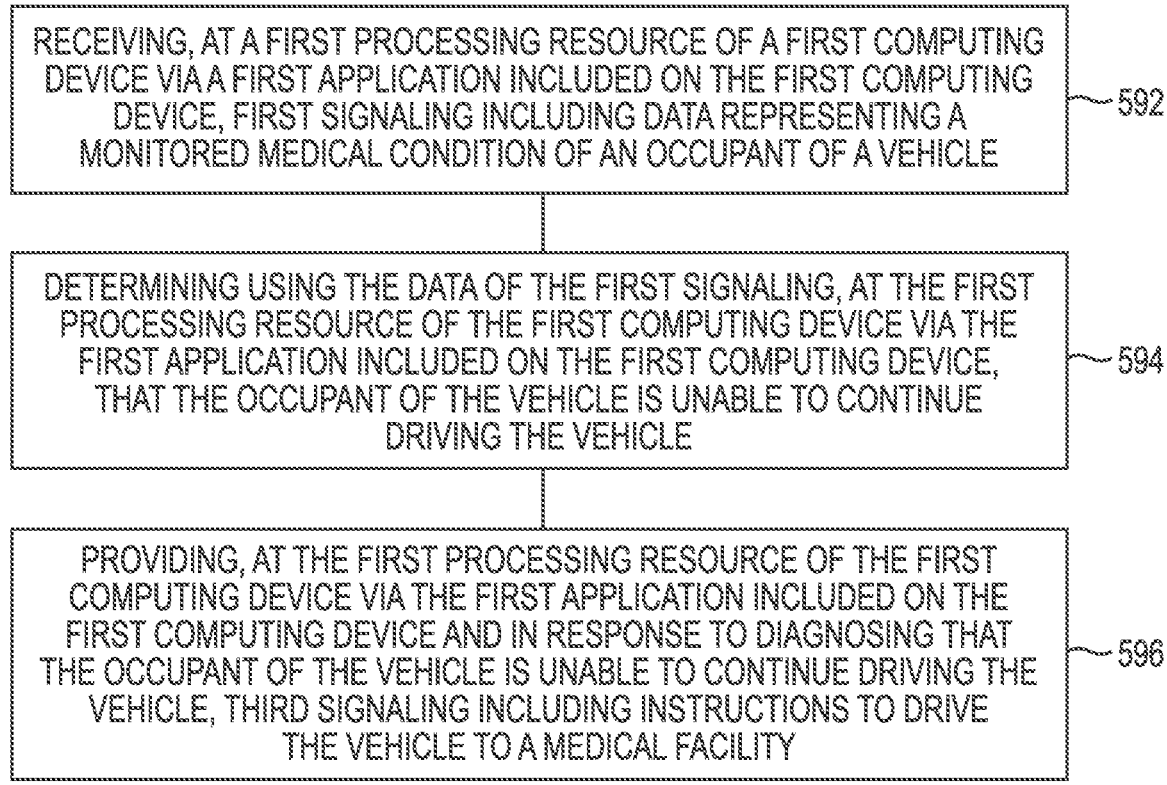
FIG. 5 is a flow diagram representing an example method for vehicle occupant emergency monitoring in accordance with a number of embodiments of the present disclosure.

FIG. 5 is a flow diagram representing an example method for vehicle occupant emergency monitoring in accordance with a number of embodiments of the present disclosure. At 592, the method includes receiving, at a first processing resource of a first computing device via a first application included on the first computing device, first signaling including data representing a monitored medical condition of a occupant of a vehicle.

At 594, the method includes determining using the data of the first signaling, at the first processing resource of the first computing device via the first application included on the first computing device, that the occupant of the vehicle is unable to continue driving the vehicle.

At 596, the method providing, at the first processing resource of the first computing device via the first application included on the first computing device and in response to determining that the occupant of the vehicle is unable to continue driving the vehicle, third signaling including instructions to drive the vehicle to a medical facility.

The method can also include sending a notification of medical condition of the occupant of the vehicle to a family member of the occupant, a notification to the medical facility indicating the medical condition of the occupant and that the vehicle will be arriving at the medical facility, an estimated time of arrival at medical facility, a notification of the including a description of the vehicle (e.g., make, model, and/or color, among other descriptions), a notification to police of a route the vehicle is taking to the medical facility, a notification to other vehicles on the road of a medical emergency, instructions to pull over the vehicle and signal emergency services for help, instructions to drive the vehicle to a preferred medical facility of the occupant of the vehicle, and/or sending a notification of a medical emergency to family of the occupant of the vehicle Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
receiving, at a first processing resource of a first computing device via a first application included on the first computing device, first signaling including data representing a monitored medical condition of an occupant of a vehicle;
determining using the data of the first signaling, at the first processing resource of the first computing device via the first application included on the first computing device, that the occupant of the vehicle is unable to continue driving the vehicle; and
providing, at the first processing resource of the first computing device via the first application included on the first computing device and in response to determining that the occupant of the vehicle is unable to continue driving the vehicle, third signaling including instructions to drive the vehicle to a medical facility; and
providing, at the first processing resource of the first computing device via the first application included on the first computing device, a notification to a preferred medical provider regarding the medical condition of the occupant and a notification to the medical facility indicating the medical condition of the occupant, wherein the medical facility and the preferred medical provider are different entities; and
disabling, at the first processing resource of the first computing device via the first application included on the first computing device, a redirection command sent to the vehicle from a user of a family application in response to determining that the occupant of the vehicle is unable to continue driving the vehicle.

2. The method of claim 1, wherein determining that the occupant of the vehicle is unable to continue driving the vehicle includes receiving medical condition indicators of the occupant and monitoring the medical condition indicators for falling below threshold values and/or receiving a medical emergency indication.

3. The method of claim 1, further comprising sending, at the first computing device via the first application included on the first computing device, a notification to the medical facility indicating the medical condition of the occupant and that the vehicle will be arriving at the medical facility.

4. The method of claim 1, further comprising sending, at the first computing device via the first application included on the first computing device, an estimated time of arrival at medical facility.

5. The method of claim 1, further comprising sending, at the first computing device via the first application included on the first computing device, a notification to police of a route the vehicle is taking to the medical facility.

6. The method of claim 1, further comprising sending, by the first processing resource of the first computing device via the first application included on the first computing device, a notification to other vehicles on the road of a medical emergency.

7. The method of claim 1, further comprising providing, at the first processing resource of the first computing device via the first application included on the first computing device, third signaling including instructions to pull over the vehicle and signal emergency services for help.

8. The method of claim 1, providing, at the first processing resource of the first computing device via the first application included on the first computing device and in response to determining that the occupant of the vehicle is unable to continue driving the vehicle, third signaling including instructions to drive the vehicle to a preferred medical facility of the occupant of the vehicle.

9. The method of claim 8, further including sending, at the first processing resource of the first computing device via the first application included on the first computing device, a notification of a medical emergency to family of the occupant of the vehicle.

10. A system, comprising:
a first computing device comprising a first processing resource configured to execute instructions stored in a first memory to:
receive first signaling including data representing a medical condition of a occupant of a vehicle; and
determine whether or not the occupant of the vehicle is able to continue driving the vehicle based on the data representing the medical condition of the occupant of the vehicle; and
a second computing device comprising a second processing resource configured to execute instructions stored in a second memory to:
receive second signaling including data representing the medical condition of the occupant of the vehicle in response to a determination that the occupant is unable to continue driving the vehicle; and
provide third signaling including instructions to drive the vehicle to a medical facility; and
provide fourth signaling including a notification to a preferred medical provider regarding the occupant's medical condition; and
provide the medical condition of the occupant and a notification to the medical facility indicating the medical condition of the occupant, wherein the medical facility and the preferred medical provider are different entities and
disable a redirection command sent to the vehicle from a user of a family application in response to determining that the occupant of the vehicle is unable to continue driving the vehicle.

11. The system of claim 10, wherein the first processing resource is configured to execute instructions to receive signaling including data representing the medical condition of the occupant of the vehicle at periodic intervals and wherein the second computing device is located on the vehicle.

12. The system of claim 10, wherein the second processing resource is configured to execute instructions to provide a notification of a medical emergency to family of the occupant of the vehicle.

13. The system of claim 10, wherein the second processing resource is configured to execute instructions to provide a notification of a medical emergency to the medical facility.

14. The system of claim 13, wherein the second processing resource is configured to execute instructions to provide a notification of a medical emergency to the police.

15. A non-transitory machine-readable medium comprising a first processing resource in communication with a memory resource having instructions executable to:
- receive at the first processing resource, the memory resource, or both, data representing a medical emergency of an occupant of a vehicle, via first signaling sent via a radio in communication with a second processing resource of a computing device; and
- transmit at the first processing resource, the memory resource, or both, instructions to drive the vehicle to a medical facility in response to receiving the data representing the medical emergency; and
- transmit at the first processing resource, the memory resource, or both, a notification to a preferred medical provider regarding the occupant's medical condition;
- provide the medical condition of the occupant and a notification to the medical facility indicating the medical condition of the occupant, wherein the medical facility and the preferred medical provider are different entities; and
- disable at the first processing resource, the memory resource, or both, a redirection command sent to the vehicle from a user of a family application in response to the medical emergency.

16. The medium of claim 15, further including having instructions executable to transmit at the first processing resource, the memory resource, or both, data representing a notification to family of the occupant that the occupant is having the medical emergency.

17. The medium of claim 15, further including having instructions executable to transmit at the first processing resource, the memory resource, or both, data representing a notification to the medial facility that the vehicle is arriving with the occupant is having the medical emergency.

18. The medium of claim 15, further including having instructions executable to transmit at the first processing resource, the memory resource, or both, data representing instructions to drive to a preferred medical facility of the occupant.

19. The medium of claim 15, further including having instructions executable to transmit at the first processing resource, the memory resource, or both, data representing a notification of the medical emergency to other vehicles on the road.

20. The medium of claim 15, further including having instructions executable to transmit at the first processing resource, the memory resource, or both, data representing instructions to pull over the vehicle and signal emergency services for help.

* * * * *